United States Patent [19]
Lapeyre et al.

[11] Patent Number: 5,775,480
[45] Date of Patent: Jul. 7, 1998

[54] LOW-FRICTION CONVEYOR ASSEMBLY

[75] Inventors: Robert S. Lapeyre, New Orleans; Christopher G. Greve, Covington, both of La.

[73] Assignee: The Laitram Corporation, Harahan, La.

[21] Appl. No.: 664,394

[22] Filed: Jun. 14, 1996

[51] Int. Cl.$^6$ .................................................. B65G 21/16
[52] U.S. Cl. ........................................ 198/831; 198/852
[58] Field of Search ........................... 198/831, 778, 198/850, 852, 853

[56] References Cited

U.S. PATENT DOCUMENTS

| | | | |
|---|---|---|---|
| 3,265,193 | 8/1966 | Bessant | 198/831 X |
| 3,693,780 | 9/1972 | Fraioli, Sr. | 198/831 |
| 3,854,575 | 12/1974 | Fraioli, Sr. | 198/831 |
| 3,951,256 | 4/1976 | Gurewitz | 198/831 |
| 4,852,722 | 8/1989 | Houseman | 198/852 X |
| 5,009,302 | 4/1991 | Sansevero | 198/778 X |
| 5,372,248 | 12/1994 | Horton | 198/852 |

Primary Examiner—James R. Bidwell
Attorney, Agent, or Firm—James T. Cronvich

[57] ABSTRACT

A conveyor suitable for transporting product along a conveyor path that includes curved segments. The conveyor assembly includes a frame and a section of railing attached to the frame and arranged in an arc to form the inside of a turn. The frame supports a modular conveyor belt made up of a series of rows of belt modules hingedly interlinked end to end into an endless conveyor belt capable of articulating about a drive sprocket and of fanning out in a turn. Selected rows of the belt include belt edge structure forming a recess inward of the belt edge and opening onto the edge. A roller is rotatably disposed in the recess. The roller's outer rotatable surface extends from the recess outward of the belt edge to engage the railing at the inside of a turn in low-friction, rolling contact.

19 Claims, 5 Drawing Sheets

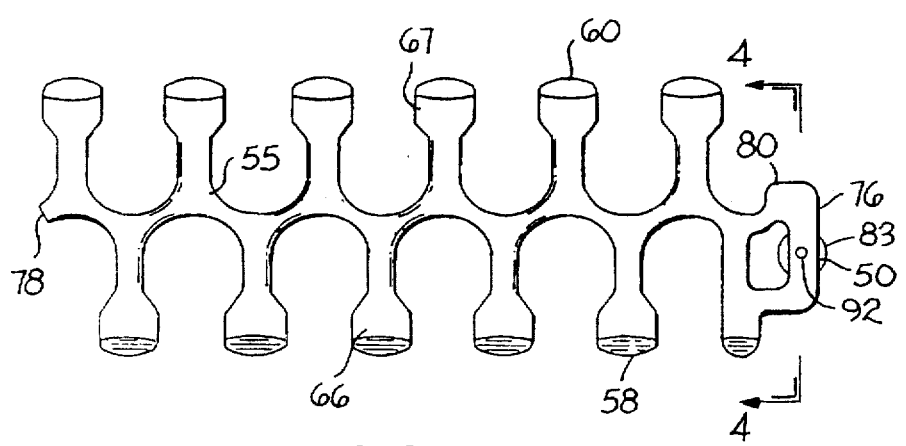
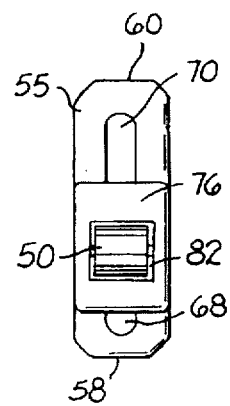
FIG. 3A
FIG. 3C
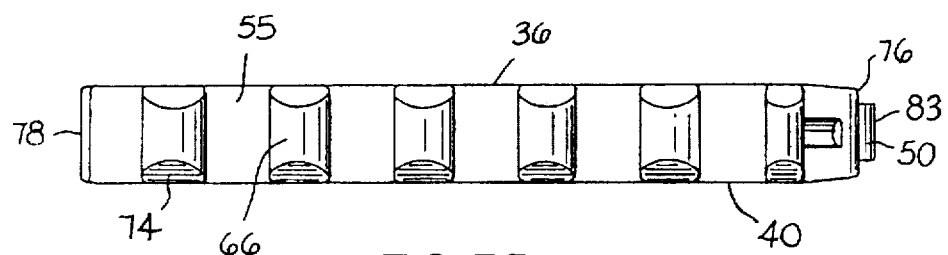
FIG. 3B
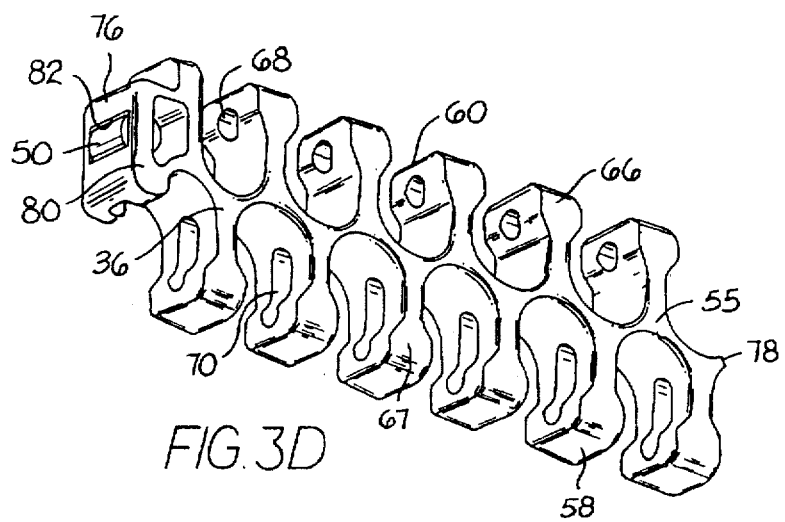
FIG. 3D 5,775,480

1

LOW-FRICTION CONVEYOR ASSEMBLY

BACKGROUND

The invention relates to power-driven conveyors and, more particularly, to modular conveyor belts constructed of rows of belt modules hingedly interlinked end to end by hinge pins.

Because they do not corrode and are easy to clean, plastic conveyor belts are used widely, especially to convey food products. Modular plastic conveyor belts are made up of molded plastic modular links, or belt modules, arranged in rows. Spaced apart link ends extending from each end of the modules include aligned apertures to accommodate a pivot rod. The link ends along one end of a row of modules are interleaved with the link ends of an adjacent row. A pivot rod, or hinge pin, journalled in the aligned apertures of the end-to-end-connected rows, connects adjacent rows together to form an endless conveyor belt capable of articulating about a drive sprocket.

In many industrial applications, belt conveyors are used to carry products along paths including curved, as well as straight, segments. A curved side rail attached to the conveyor frame typically defines the inside of a turn and guides the belt around the turn. Belts capable of flexing sidewise to follow curved paths are referred to as side-flexing, turn, or radius belts. As a radius belt negotiates a turn, the belt must fan out because the outside of the belt follows a longer path than the inside of the belt. In many radius conveyor systems, the edge of the belt at the inside of the turn rubs against the side rail. The resulting friction between the inside edge of the belt and the side rail causes premature wearing of the belt or the side rail. Furthermore, either a more powerful drive motor must be used to overcome the friction or the product load must be decreased. Thus, friction at the inside of a turn has a price either in higher equipment or energy costs or in decreased productivity.

Casters attached to the sides of metal belts have been used to alleviate problems associated with friction at the inside of a turn. But, by protruding well beyond the side edge of the belt, caster assemblies are prone to snagging nearby objects or clothing as the belt traverses a straight segment without side rails. Furthermore, caster assemblies that protrude well beyond the edge of the conveying area of the belt take up additional valuable plant space.

SUMMARY

Friction in turns, snagging, and other shortcomings of radius conveyor systems are avoided by the invention, which provides a conveyor assembly suitable for conveying product along a path that includes a turn. The conveyor assembly includes a conveyor frame and a section of railing attached to the frame. The section of railing is arranged along an arc to form the inside of a turn. The frame supports an endless modular conveyor belt capable of following straight or curved paths. The belt is constructed of a succession of rows of belt modules having top and bottom surfaces and hinge elements projecting from each end and spaced apart along the width of the row. Consecutive rows of belt modules are linked hinge-like by hinge pins extending laterally between interleaved hinge elements of adjacent rows of modules. The hinge elements on one end of the row define slots that are elongated in the direction of belt travel. The slots accommodate the hinge pins and allow the belt to fan out in a turn. Selected rows of the belt provide edge structure at a side edge of the belt that forms a recess inward of and opening onto the side edge. A roller, disposed

2 rotatably in the recess, has a rotatable outer surface that extends from the recess slightly outward of the side edge. The roller engages the railing at the inside of a turn in low-friction, rolling contact. Because the roller protrudes only slightly beyond the edge of the belt, any tendency of the belt edge to snag nearby objects is minimized.

In a preferred version, the roller is cylindrical and circumscribes a central bore. A shaft inserted in a hole that extends from a top or bottom surface of a belt module at the edge structure to the recess is positioned spanning the recess. The shaft is journalled in the bore of the roller so that the roller can rotate about the shaft or is fixedly attached to the roller so that the shaft and the roller rotate together. The shaft is preferably oriented perpendicular to the top surface of the belt to form a line of rolling contact with the railing in the inside of a turn.

In other versions of the belt of the assembly, edge structure is provided in both sides of each row to accommodate rollers for use with a conveyor system having side railings forming the inside of both left and right turns. Other belt versions may include a single module in each row with roller edges at one or both ends, or multiple modules in each row with special edge modules having roller edges at the outer side of the belt to avoid the problems associated with friction in the turns of radius conveyor systems.

DRAWINGS

These and other advantages, features, and aspects of the invention are described in more detail in the following description, appended claims, and accompanying drawings in which:

FIGS. 3A–3D are, respectively, plan, front elevation, side elevation, and perspective views of an edge module of the belt section of FIG. 2;

DESCRIPTION

Figure 1:
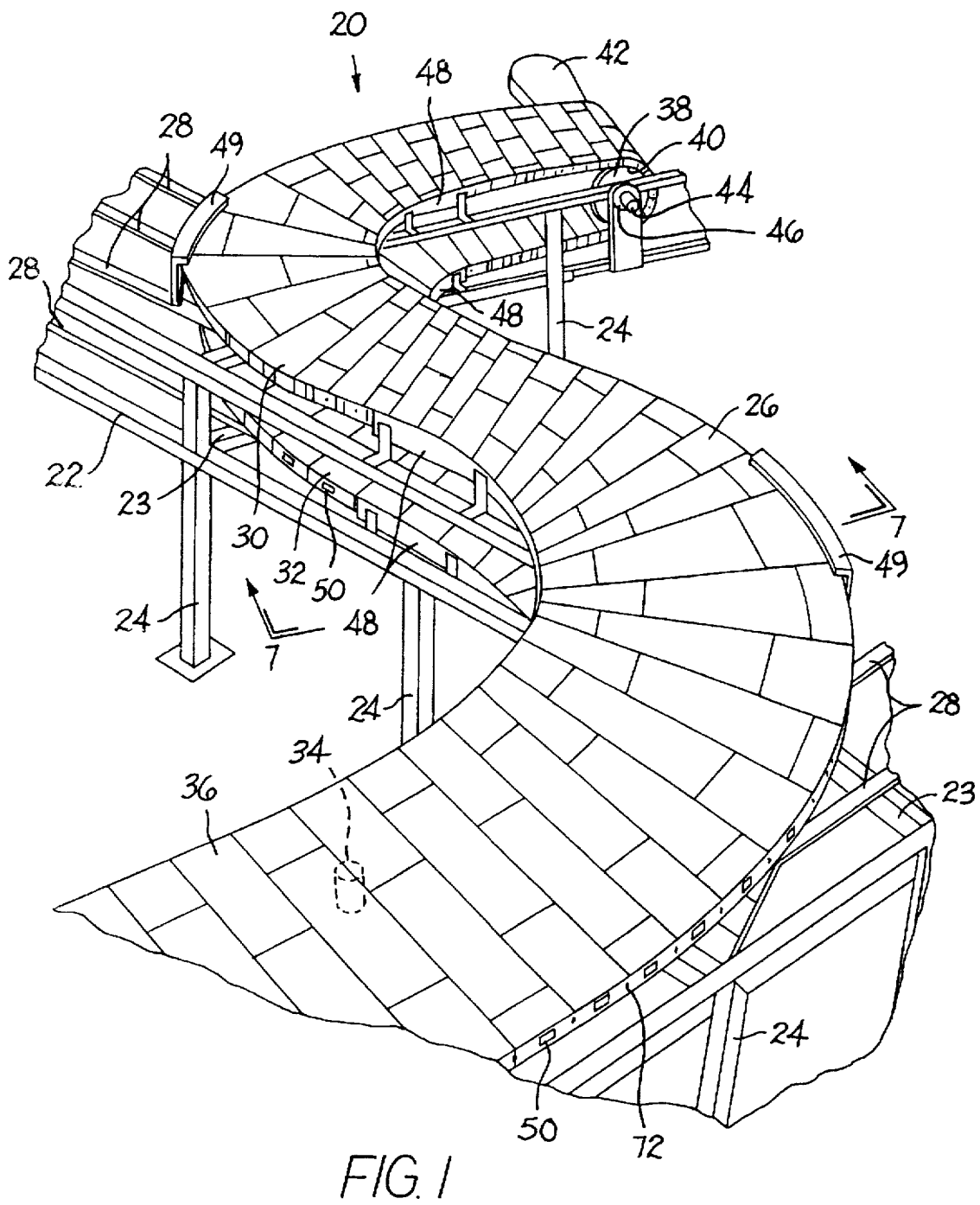
FIG. 1 is a partial perspective view of one version of a conveyor assembly having features of the invention.

A portion of an exemplary version of a low-friction radius conveyor assembly having features of the invention is shown FIG. 1. The conveyor assembly 20 includes a framework 22 including crossbeams 23 supported by legs 24. The framework supports a radius conveyor belt 26 on wearstrips 28 having a durable, low-friction surface. The belt travels generally along two levels—an upper carryway 30 and a lower returnway 32. Product 34 is transported along a top conveying surface 36 of the belt. The belt is positively driven by sprockets 38 whose teeth engage drive surfaces in the bottom surface 40 of the belt. The sprockets are driven by a motor 42 coupled to a drive shaft 44 supported by bearing assemblies 46 mounted on the framework 22. The belt 26 articulates about the sprockets from the carryway level to the returnway level at an end of the conveyor assembly. Railings 48, attached to the frame 22, guide the belt around the inside of turns on both the carryway and the returnway. Holddown rails 49 at the outside of turns overlap the outside of the belt to restrain it in the conveying plane. The edge of the belt includes rollers 50 protruding outward slightly to engage the railings in low-friction rolling contact.

Figure 2:
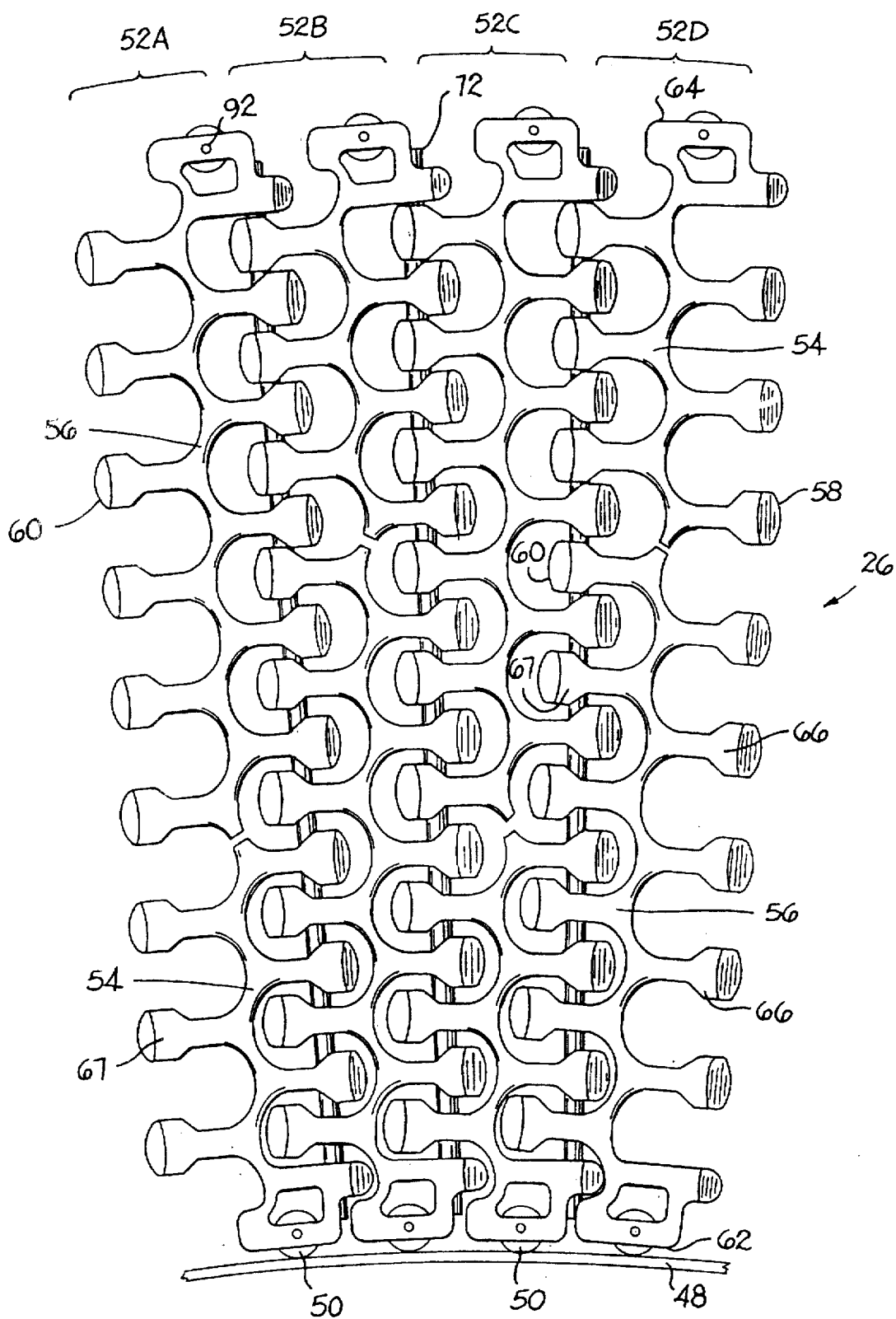
FIG. 2 is a plan view of a four-row section of one version of a modular conveyor belt with edge rollers engaging an inside railing as in the conveyor assembly of FIG. 1.
Figure 4:
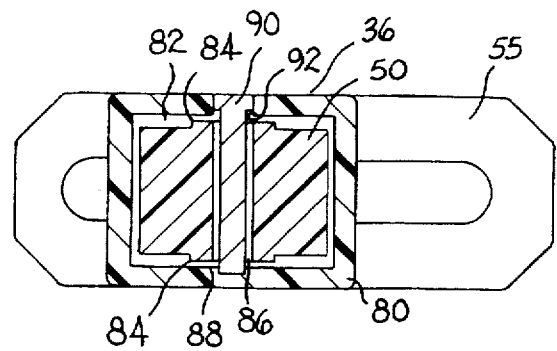
FIG. 4 is an enlarged cross-sectional side elevation view of the edge structure of the edge module of FIGS. 3A–3D taken along cut line 4—4 of FIG. 3A.

Details of one version of a belt suitable for use with the conveyor assembly of FIG. 1 are shown in FIGS. 2–4. The belt depicted has many of the features of and is similar to the Intralox Series 2200 modular plastic conveyor belt manufactured by Intralox, Inc. of Harahan, La., a subsidiary of the assignee of this invention. As shown in FIG. 2, the belt 26 is constructed of a series of rows 52A–52D of belt modules 54, 56. In this version, each row 52 includes a short edge module 54 at one edge and a long edge module 56 at the opposite edge. Other versions are possible. For example, each row could be made up of a single module extending across the entire width of the belt. Alternatively, the belt could include one or more internal modules positioned between the edge modules 54, 56. Although the version shown in FIG. 2 and all other versions having multiple modules in each row are preferably arranged in a bricklaid pattern, it would be possible to construct a belt having features of the invention in an arrangement with a continuous seam along the length of the belt between adjacent side-by-side and end-to-end modules. In all of these belt constructions, wider belts can be made by constructing each row with wider or more modules.

As shown in FIG. 2 and further detailed in FIGS. 3A–3D, each row 52 extends longitudinally from a first end 58 to a second end 60 and laterally from a first side edge 62 to a second side edge 64 and forms a top product-conveying surface 36 and an opposite bottom surface 40. Spaced apart hinge elements 66, 67 extend from each end 58, 60 of each row. Apertures 68 formed in the hinge elements 66 at the first end 58 of each row 52 are coaxially aligned with one another. Slots 70 formed in the hinge elements 67 at the second end 60 of each row 52 are coaxially aligned with one another. Consecutive rows, 52A and 52B, for instance, are interlinked hinge-like by a hinge pin 72 extending through a lateral passageway formed by the aligned slots 70 and 68 of interleaved hinge elements 66, 67 disposed at adjacent ends of consecutive rows. All the rows of the belt are connected in this way to form an endless conveyor belt capable of articulating about a drive sprocket 38 engaging drive surfaces 74 at the bottom surface 40 of the belt. The slots 70 in the hinge elements 67 at the second end 60 of each row are preferably elongated in the direction of belt travel to permit the belt to fan out in a turn. The hinge between consecutive rows can be realized equivalently in other ways. For example, stubs protruding laterally from the sides of the hinge elements at the first end of a row and extending into aligned slots in the interleaved set of hinge elements of an adjacent row could be used instead of the continuous hinge pin to hingedly interconnect adjacent rows.

As the belt 26 negotiates a turn, the inside follows a shorter path than the outside. The slots 70 allow the inside edge 62 to collapse as the outside edge 64 expands. Rollers 50 protruding slightly outward of first side edge 62 engage the inside railing 48 in rolling contact. In this way, the tremendous friction that would occur in the absence of rollers is avoided. Drive power and belt strength can be used to handle product load instead of to overcome frictional resistance.

An exemplary edge module 55 is shown in FIGS. 3A–3D. The module body extends from a first end 58 to a second end 60 and from a first side edge 76 to a second side edge 78. Opposite top and bottom surfaces 36, 40 extend across the width of the module body. A first group of hinge elements 66 is spaced apart along the first end of the module, and a second group of hinge elements 67 is spaced along the second end. The hinge elements 66 of the first group circumscribe apertures 68, preferably circular in cross section, aligned along a lateral axis. The hinge elements 67 of the second group circumscribe slots 70, preferably elongated longitudinally, aligned along a second lateral axis. Edge structure 80 at the first side edge 76 includes a recess 82 disposed inward of and opening onto the first side edge. A roller 50, rotatably mounted in the recess 82, has an outer rotating surface 83 that protrudes through the recess's opening at the first side edge 76. Only a slight protrusion is required to achieve the low-friction benefits of a belt constructed of these edge modules 55. The minimal amount of protrusion also lessens the tendency of the rollers to snag when coming into contact with foreign objects along the edge of the belt in unguarded straight runs or at the outside of turns.

Figure 5:
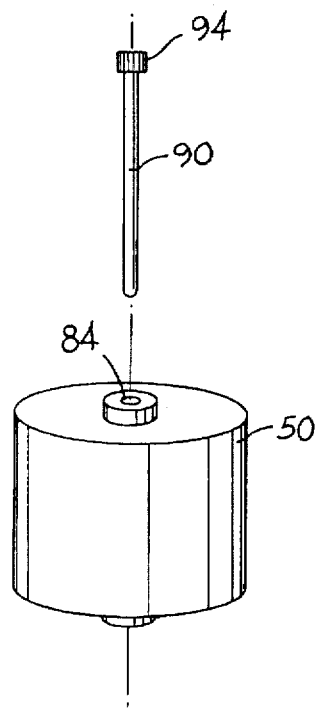
FIG. 5 is an exploded view of one version of a roller and journal shaft that can be used with the belt edge module of FIG. 2.

FIGS. 4–5 show further details of one version of the roller assembly. The generally cylindrical roller 50 shown has top and bottom bearing shoulders 84 and a central bore 86. The bottom bearing shoulder bears against the floor 88 of the recess 82 in low-friction engagement as the roller rotates upon contact with railing in the inside of a turn. The roller 50 rotates about a journal shaft 90, which is press-fitted into the edge structure 80 through a hole 92 that extends from the top surface 36 of the module to the recess 82. The head 94 of the shaft is knurled to bite into the hole walls for a secure fix. The other end of the shaft 90 is driven into the floor of the recess. The diameter of the shaft 90 is slightly less than the diameter of the bore 86 so that the roller 50 can rotate freely, without wobbling, about the shaft. The axis of the shaft 90 is preferably oriented perpendicular to the top surface of the module to align the outer rolling surface 83 with the vertical bearing surfaces typical of conventional guard railings. Alternatively, the hole 92 could extend from the bottom surface 40 to the recess 82, and the shaft 90 inserted from that surface of the module. The hole could extend through the module from the top surface to the bottom surface so that the shaft could be inserted from either surface. With the hole through the entire thickness of the module, the roller 50 can be removed by driving the shaft out through the continuous hole.

Figure 6:
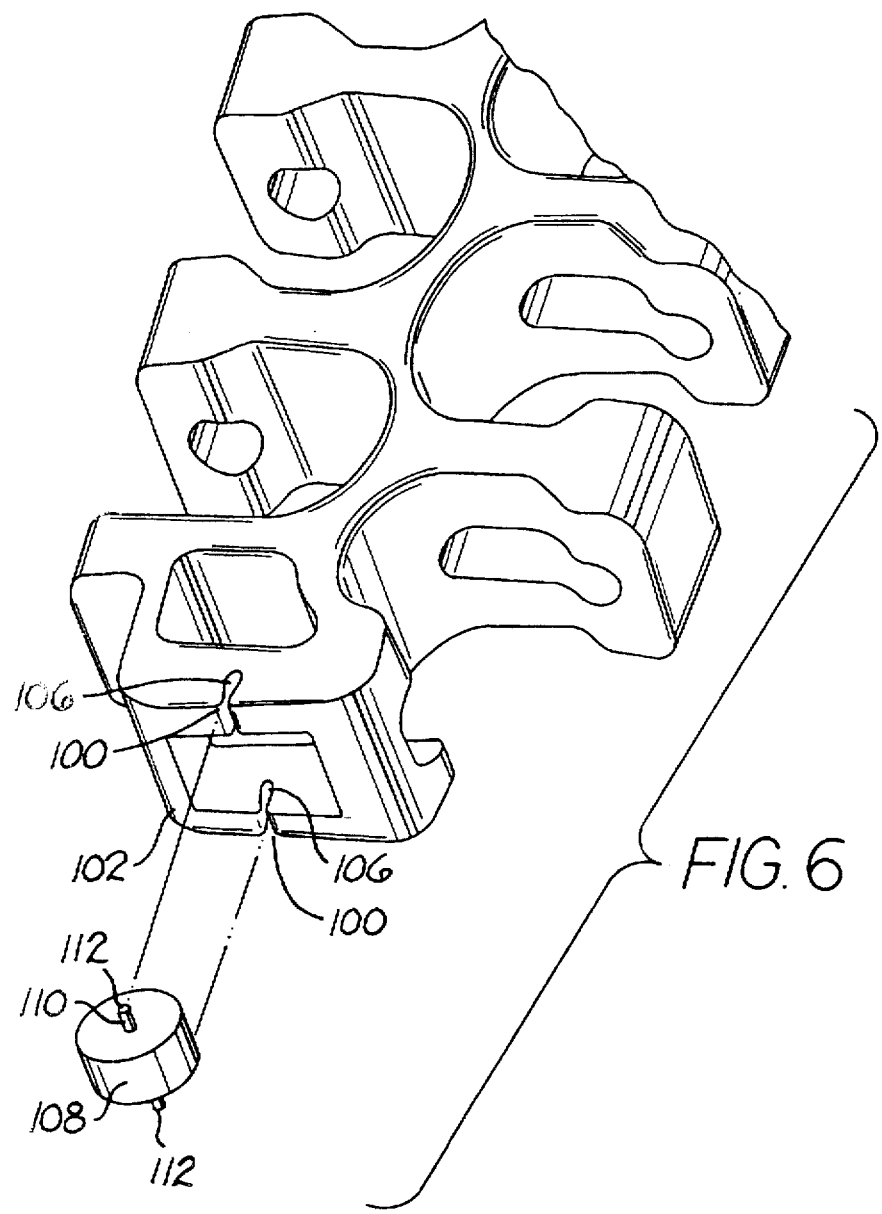
FIG. 6 is an exploded partial perspective view of another version of belt edge structure and a roller usable with the conveyor assembly of FIG. 1.

Another version of the roller is shown in FIG. 6, in which the roller snaps in place in the edge of the belt. Slots 100 extend from the outer edge 102 of the belt inwardly to larger resident ends 106. A roller 108 is fixedly attached, or, as one alternative, journalled about, a shaft 110. End portions 112, or stubs, of the shaft, extending from the upper and lower ends of the roller 108, have an outside dimension greater than the narrowest dimension of the slots 100. In this way, the roller and shaft assembly is easily snapped into place in the resident ends of the slots from the outside edge of the belt.

Figure 7:
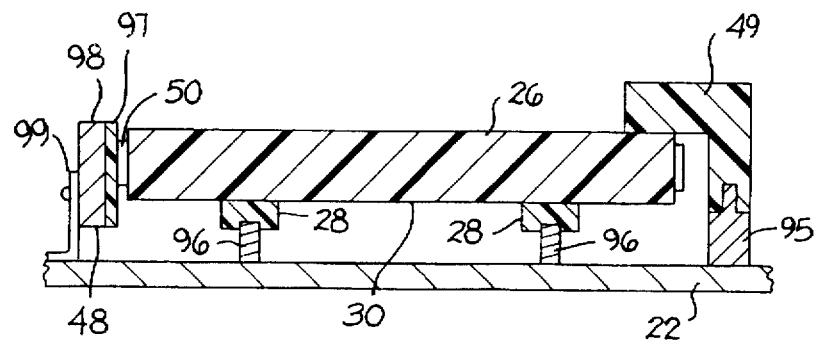
FIG. 7 is a cross-sectional front elevation view of the product carryway portion of the conveyor assembly of FIG. 1 taken along cut line 7—7.

The engagement of the belt with the railing at the inside of a turn is best shown in FIG. 7. The belt 26 is supported on the carryway level 30 by wearstrips 28 attached to the frame 22 by supports 96. The railing 48 comprises an inside bearing surface 97, preferably made of a durable, low-friction plastic material, such as UHMW (Ultra High Molecular Weight) Polyethylene, HDPE (High Density Polyethylene), or Nylatron (molybdenum-filled nylon), or even of a higher-friction material, such as stainless steel or rubber-coated steel, and a sturdy metal backing 98. The railing is attached to the frame by a bracket 99, for example. As the belt negotiates a turn, its inside edge is pulled against the railing at the inside of the turn. The edge of the belt at the outside of the turn is restrained from rising by the overlapping lip of the holddown rail 49 attached to the frame 22 by a support 95. The slightly protruding roller 50 at the inside edge contacts the railing. As the belt is pulled along by the drive motor, the contact at the inside of the turn causes the roller 50 to rotate. The rotating roller provides a low-friction contact between the belt 26 and the railing 48.

Many combinations of materials can be used to achieve different results. For example, one preferred combination for use with a polypropylene belt and a UHMW railing includes a stainless steel pin for strength and a polyacetal roller for durability and low-friction interaction with both the UHMW railing and the polypropylene belt surfaces against which the roller bears.

Although the invention has been described in detail with reference to a single version, those skilled in the art will readily appreciate that many modifications are possible in the exemplary version without materially departing from the novel teachings and advantages of the invention. For example, rollers need not be used in each belt row especially if tight turns are not required. If a belt makes left turns only, rollers are not needed at all on the right-hand (outside) edge of the belt. Instead of a single roller at the edge of a belt row, two or more individual short rollers spaced apart vertically could be used. The roller itself need not be circular cylindrical in shape. If, for example, the bearing surface of the railing at the inside of a turn is canted, the roller could be frustoconical in shape to match the slope of the cant and to provide a longer bearing line of contact for a given roller height. The function of the shaft could also be realized by a pair of stubs, extending from the upper and lower surfaces of the roller and rotatably retained in the edge structure of the belt module. As the examples suggest, these and other modifications are intended to be included within the scope of the invention as defined in the following claims.

What is claimed is:

1. A conveyor assembly suitable for conveying product along a path that includes a turn, comprising:

a frame;

a section of railing attached to the frame and arcuately arranged to form the inside of a turn; and a conveyor belt supported in the frame and including a series of rows of belt modules, each row extending longitudinally from a first end to a second end and laterally from a first side edge to a second side edge and forming a top product-conveying surface, the rows being hingedly interlinked end-to-end into an endless conveyor belt by hinge pins extending laterally between interleaved hinge elements disposed at adjacent ends of consecutive rows, wherein the hinge elements at the second end of a row define aligned slots for accommodating the hinge pins to allow the belt to fan out in a turn, selected rows including edge structure forming a recess inward of the first side edge and opening onto the first side edge and a roller rotatably disposed in the recess and having a rotatable outer surface extending from the recess outward of the first side edge to engage the railing at the inside of the turn in rolling contact.

2. A conveyor assembly as in claim 1 further comprising another section of railing forming the inside of a turn along the second side edge of the belt and wherein the conveyor belt further comprises similar edge structure and recesses at the second side edge of selected rows of belt modules and rollers similarly rotatably disposed in the recesses with rotatable outer surfaces extending from the recesses outward of the second side edge to engage the railing at the inside of the turn in rolling contact.

3. A conveyor assembly as in claim 2 wherein the first and second side edges of every belt row comprise edge structure accommodating a roller.

4. A conveyor assembly as in claim 1 wherein the railing and the roller are made of different materials.

5. A modular conveyor belt suitable for following a conveying path that includes a turn, comprising a series of rows of belt modules, each row extending longitudinally from a first end to a second end and laterally from a first side edge to a second side edge and forming a top surface and an opposite bottom surface, the rows being hingedly interlinked end-to-end into an endless conveyor belt by hinge pins extending laterally between interleaved hinge elements disposed at adjacent ends of consecutive rows, wherein the hinge elements at the second end of a row define aligned slots for accommodating the hinge pins to allow the belt to fan out in a turn, selected rows including edge structure forming a recess inward of the first side edge and opening onto the first side edge and a roller rotatably disposed in the recess and having a rotatable outer surface extending from the recess outward of the first side edge.

6. A modular conveyor belt as in claim 5 wherein selected rows comprise edge structure at the second side edge forming a recess inward of the second side edge and opening onto the second side edge and a roller rotatably disposed in the recess and having a rotatable outer surface extending from the recess outward of the second side edge.

7. A modular conveyor belt as in claim 6 wherein the first and second side edges of each belt row comprise edge structure accommodating a roller.

8. A modular conveyor belt as in claim 5 comprising a shaft spanning the recess and fixed at each end to the belt edge structure and wherein the roller circumscribes a central bore journalling the shaft around which the roller rotates.

9. A modular conveyor belt as in claim 8 comprising a top surface and an opposite bottom surface extending across the belt from the first side edge to the second side edge and wherein the edge structure defines a hole that extends from at least one of the top and bottom surfaces to the recess and accommodates the shaft in a press fit.

10. A modular conveyor belt as in claim 5 wherein each row comprises a plurality of modules.

11. A modular conveyor belt as in claim 5 comprising an edge module at the first side edge of the belt, the edge module including the edge structure at the first side edge of the belt and the roller.

12. A modular conveyor belt as in claim 5 further comprising means for rotating the roller about an axis perpendicular to the top surface of the belt.

13. A modular conveyor belt as in claim 5 wherein the edge structure further includes snap-in means for detachably retaining the roller in place in the recess.

14. An edge module for a conveyor belt, comprising:

a module body extending longitudinally from a first end to a second end and laterally from a first side to a second side and forming a top surface and an opposite bottom surface;

a first group of hinge elements spaced apart along the first end of the module body;

a second group of hinge elements spaced apart along the second end of the module body, each of the second group of hinge elements defining a slot;

first belt edge structure at the first side of the module body forming an outer first edge of the module and defining a recess inward of the outer first edge and opening onto the outer first edge; and a roller rotatably disposed in the recess and having a rotatable outer surface extending from the recess outward of the outer first edge.

15. An edge module as in claim 14 further comprising a shaft fixedly attached in the first belt edge structure and spanning the recess and wherein the roller circumscribes a central bore journalling the shaft, whereby the roller rotates about the shaft.

16. An edge module as in claim 15 wherein the first belt edge structure includes a hole extending from at least one of the top and bottom surfaces to the recess, the shaft being insertable through the hole.

17. An edge module as in claim 15 wherein the shaft is oriented along an axis perpendicular to the top surface of the module body.

18. An edge module as in claim 14 further comprising second belt edge structure at the second side of the module body forming an outer second edge of the module and defining a second recess inward of the outer second edge and opening onto the outer second edge and a second roller rotatably disposed in the second recess and having a rotatable outer surface extending from the second recess outward of the outer second edge.

19. An edge module as in claim 14 further comprising a roller shaft and wherein the first belt edge structure further comprises a slot formed in the belt edge structure, a portion of the slot being narrower than the thickness of the shaft, the slot extending inwardly from the outer first edge and terminating in a resident end sized to accommodate the roller shaft in a resident position.

* * * * *